United States Patent [19]

Vrana et al.

[11] Patent Number: 4,802,899
[45] Date of Patent: Feb. 7, 1989

[54] PRESSURE SWING ADSORPTION APPARATUS

[75] Inventors: Edward E. Vrana, West Seneca; Ravinder K. Bansal, Amherst, both of N.Y.

[73] Assignee: AirSep Corporation, Buffalo, N.Y.

[21] Appl. No.: 98,879

[22] Filed: Sep. 21, 1987

[51] Int. Cl.⁴ .............................................. B01D 53/04
[52] U.S. Cl. ...................................... 55/161; 55/179; 55/389
[58] Field of Search ................... 55/31, 33, 35, 62, 68, 55/74, 75, 161–163, 179, 180, 316, 387, 389

[56] References Cited

U.S. PATENT DOCUMENTS

| | | | |
|---|---|---|---|
| 2,501,280 | 3/1950 | Kemp et al. | 55/162 |
| 2,665,769 | 1/1954 | Walker et al. | 55/180 X |
| 3,016,978 | 1/1962 | Hull | 55/161 X |
| 3,155,471 | 11/1964 | Schymik et al. | 55/179 X |
| 3,164,452 | 1/1965 | Westeren et al. | 55/179 X |
| 3,258,899 | 7/1966 | Coffin | 55/162 |
| 3,323,292 | 6/1967 | Brown | 55/179 X |
| 3,448,561 | 6/1969 | Seibert et al. | 55/33 X |
| 3,543,482 | 12/1970 | Foster | 55/162 |
| 3,552,096 | 1/1971 | Dayson | 55/179 X |
| 4,231,768 | 11/1980 | Seibert et al. | 55/316 X |
| 4,263,018 | 4/1981 | McCombs et al. | 55/179 X |
| 4,272,265 | 6/1981 | Snyder | 55/161 X |
| 4,371,384 | 2/1983 | McCombs | 55/179 |
| 4,373,938 | 2/1983 | McCombs | 55/179 X |
| 4,378,982 | 4/1983 | McCombs | 55/179 X |
| 4,509,959 | 4/1985 | McCombs | 55/179 X |
| 4,545,790 | 10/1985 | Miller et al. | 55/179 X |
| 4,584,001 | 4/1986 | Dechene | 55/163 X |
| 4,631,073 | 12/1986 | Null et al. | 55/179 X |
| 4,698,075 | 10/1987 | Dechene | 55/163 |

FOREIGN PATENT DOCUMENTS 2924052 12/1980 Fed. Rep. of Germany ........ 55/179

Primary Examiner—Robert Spitzer
Attorney, Agent, or Firm—Luedeka, Hodges & Neely

[57] ABSTRACT

An air separator for separating at least one constituent element from air delivered from an air source by a pair of adsorption beds utilizes a control box and assembly of working components arranged in such a relationship to one another within the control box so as to facilitate service and maintenance of the air separator. The working components of the air separator include filtering componentry, a pressure regulator, a pair of feed valves, a pair of waste valves, a pair of product and equalization valves and a product flow controller operatively connected in flow communication with one another for routing the source air through the separator and which are arranged in a substantially vertical plane within the control box. Because the working components are arranged in a generally planar arrangement, each of the working components is readily and easily accessible.

16 Claims, 3 Drawing Sheets

PRESSURE SWING ADSORPTION APPARATUS

BACKGROUND OF THE INVENTION

This invention relates generally to apparatus for separating gas mixtures by pressure swing adsorption and relates more particularly to the arrangement of valves and other working components within such an apparatus.

The type of pressure swing adsorption apparatus with which this invention is concerned includes a pair of adsorbers each having a fixed bed of adsorbent material and an inlet and an outlet accommodating a flow of gas therethrough. The adsorbent material of each adsorber is adapted to fractionate at least one constituent from a gaseous mixture when the gaseous mixture is sequentially directed into the inlet of one adsorber so that the one adsorber performs adsorption while the other adsorber is simultaneously purged of adsorbed constituent with product gas withdrawn from the one adsorber and then the gaseous mixture is directed from the feed stream into the inlet of the other adsorber so that the other adsorber performs adsorption while the one adsorber is simultaneously purged of adsorbed constituent with product gas withdrawn from the outlet of the other adsorber. One such pressure swing adsorption apparatus is utilized for separating nitrogen from air delivered from an air source and for providing a product stream of relatively high purity oxygen.

For purposes of directing the flow of the gaseous mixture or product gas between the adsorbers in a desired manner, the adsorption apparatus commonly includes feed valving means, a purge loop and equalization valving means. The feed valving means is operatively connected between the inlets of the adsorbers and the feed stream for directing gaseous mixture from the feed stream into the inlet of one and the other adsorber in an alternating fashion so that only one adsorber at a time performs adsorption and produces product gas. The purge loop is connected between the outlets of the adsorbers for permitting product gas exiting the outlet of the adsorber performing adsorption to enter the outlet of the other adsorber for purging the other adsorber of adsorbed constituent and so that while one adsorber performs adsorption, the other adsorber undergoes desorption or regeneration. The equalization valving means is connected between the outlets of the adsorbers for equalizing the internal pressures of the adsorbers between preselected stages of apparatus operation.

Furthermore, waste valving means are associated with the inlets of the adsorbers through which product-depleted waste gas is discharged from the adsorber undergoing regeneration. For controlling the sequencing of the apparatus valving means, timing devices are commonly and operatively connected to the valving means for controlling the time periods during which the valving means are actuated and deactuated. Hence, the timing devices provide means by which the operation and various stages of the apparatus are automatically controlled.

It is an object of the present invention to provide a new and improved pressure swing adsorption apparatus wherein working components, such as the aforedescribed valving means of the apparatus are arranged in a manner facilitating service and maintenance of the apparatus.

Another object of the present invention is to provide such an apparatus which is uncomplicated in structure yet effective in operation.

SUMMARY OF THE INVENTION

This invention resides in a pressure swing adsorption apparatus having working components arranged in an advantageous relationship with one another.

The pressure swing adsorption apparatus includes a pair of adsorbers each having an inlet and an outlet and adapted to fractionate at least one constituent from a gaseous mixture delivered from a feed stream. In operation, the gaseous mixture from the feed stream is sequentially directed into the inlet of one adsorber so that the one adsorber performs adsorption while the other adsorber is simultaneously purged of adsorbed constituent with product gas withdrawn from the outlet of the one adsorber and then directing the gaseous mixture from the feed stream into the inlet of the other adsorber so that the other adsorber performs adsorption while the one adsorber is simultaneously purged of adsorbed constituent with product gas withdrawn from the outlet of the other adsorber.

The apparatus further includes feed and waste valving means associated with the inlets of the adsorbers through which the gaseous mixture is selectively routed to the inlet of one or the other adsorber for the production of product gas and through which product-depleted waste gas is discharged from the adsorber being purged. Furthermore, a purge loop and equalization valving means are associated with the outlets of the adsorbers permitting the adsorbers to communicate with one another through the outlets thereof for the purposes of purging one and then the other of the adsorbers and for equalizing the internal pressure of the adsorbers between preselected stages of adsorber operation.

The improvement is characterized in that the feed valving means, the waste valving means and the equalization valving means are disposed in such a relationship to one another that service and maintenance of the apparatus is facilitated.

BRIEF DESCRIPTION OF THE DRAWING FIGURES

DETAILED DESCRIPTION OF THE ILLUSTRATED EMBODIMENT

Figure 1:
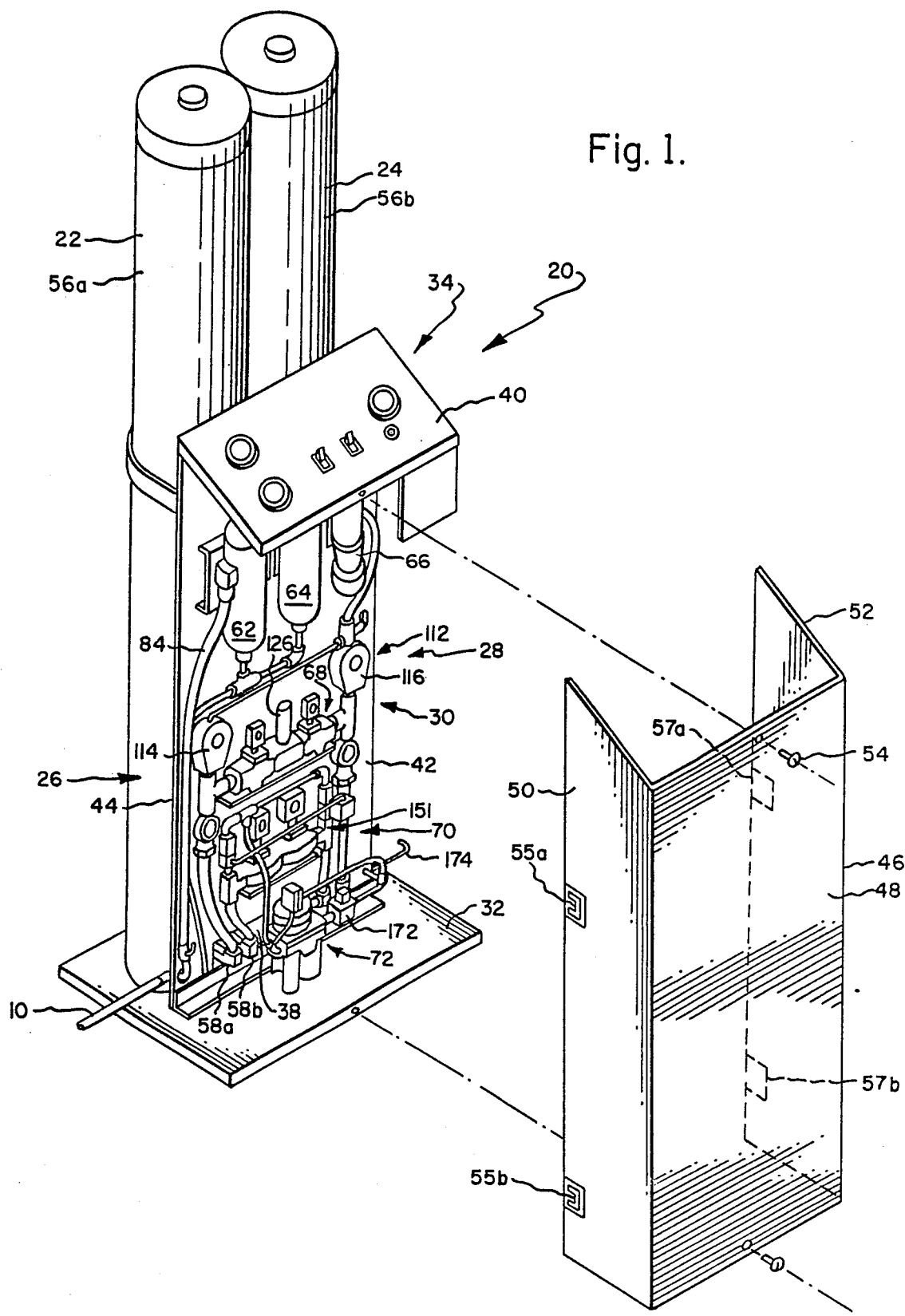
FIG. 1 is a perspective view of an air separator in accordance with the present invention shown with its front cover detached from the remainder of the separator.
Figure 2:
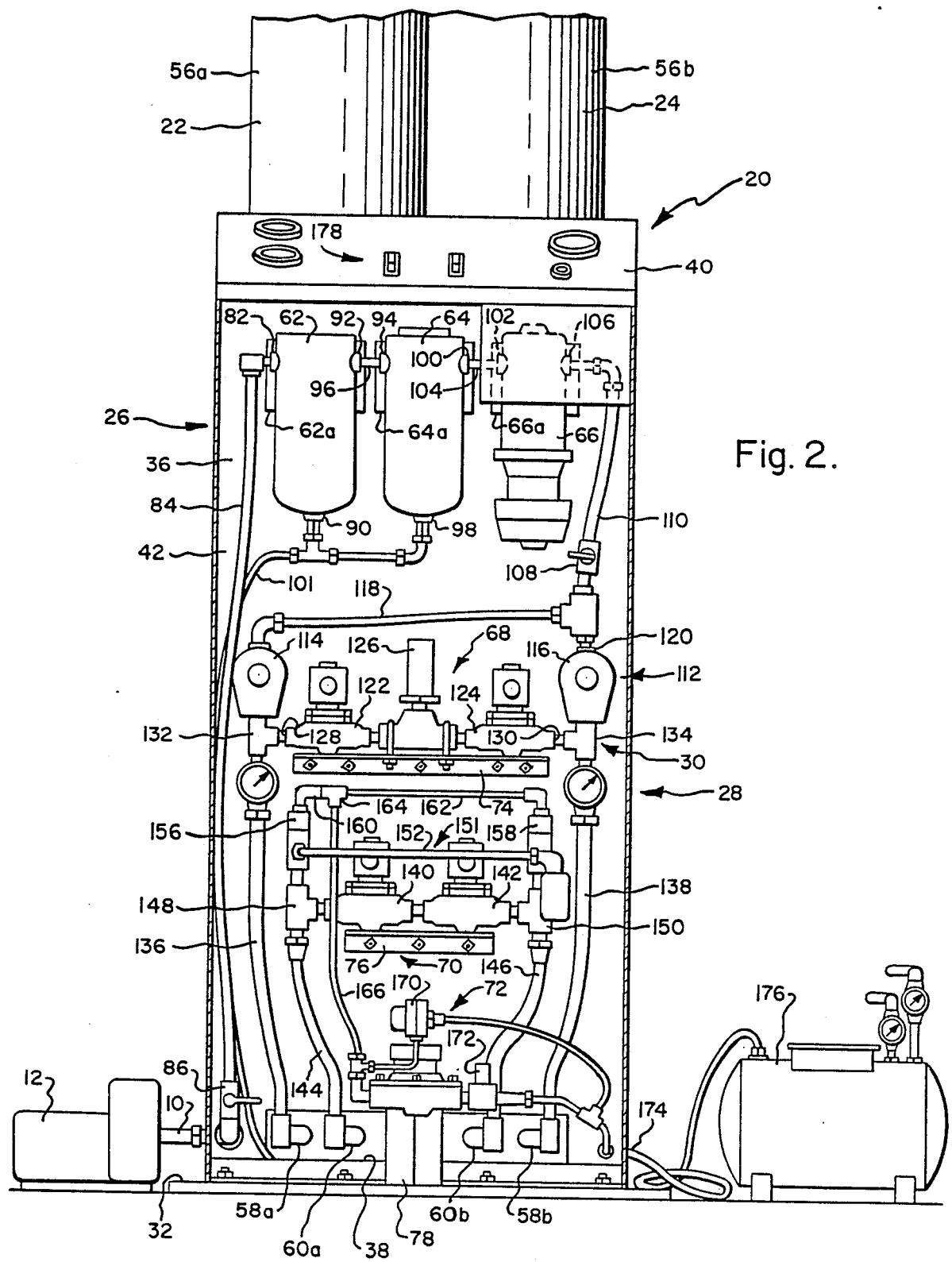
FIG. 2 is a fragmentary plan view of the FIG. 1 separator shown with its front cover removed and an associated compressor and surge tank.

Turning now to the drawing in greater detail and considering first FIG. 1, there is shown an embodiment, generally indicated 20, of an apparatus in accordance with the present invention for fractionating at least one component or constituent from a gaseous mixture by pressure swing adsorption. The gaseous mixture is supplied to the apparatus 20 by a feed gas stream which flows along an input conduit 10 and is moved therealong by means of a pump or compressor 12 (FIG. 2). As will be apparent hereinafter, the apparatus 20 is specifically described and illustrated in relation to the application of pressure swing adsorption to the fractionation of air to produce an oxygen-rich stream. Hence, the gaseous mixture supplied to the apparatus 20 by means of the conduit 10 is compressed atmospheric air.

With reference to FIGS. 1 and 2, the apparatus, or air separator, 20 includes a base 32, a pair of upstanding adsorber units or towers 22,24, a control box 26, and an assembly 28 of working components, generally indicated 30 and hereinafter described, for routing the flow of source air through the separator 20. The control box 26 is supported upon the base 32 and includes housing means, generally indicated 34, defining a planar back 36 and a top 40. The back 36 is oriented generally vertically and defines a front surface 42 and a back surface 44. For a reason which will be apparent hereinafter, the back 36 defines an access slot 38 adjacent the lower end thereof. Furthermore, each of the back 36, and top 40 is constructed of a suitably rigid material, such as steel, and can be formed from a single sheet of steel bent so as to define corners at appropriate locations.

The control box 26 further includes a cover 46 having a front 48 and two opposite sides 50,52 each extending at a right angle to the front 48. The front 48 and sides 50,52 can be integrally formed from a single sheet of steel and are so shaped that when the cover 46 is positioned in operative relationship with the housing means 34, the cover 46 and housing means 34 cooperate to provide a protective enclosure for the component assembly 28. Screws 54 and latches 55a, 55b, 57a and 57b are utilized to join the cover front 48 to the back 36 and the housing means top 40 to thereby fixedly and releasably attach the cover 46 to the housing means 34.

Figure 3:
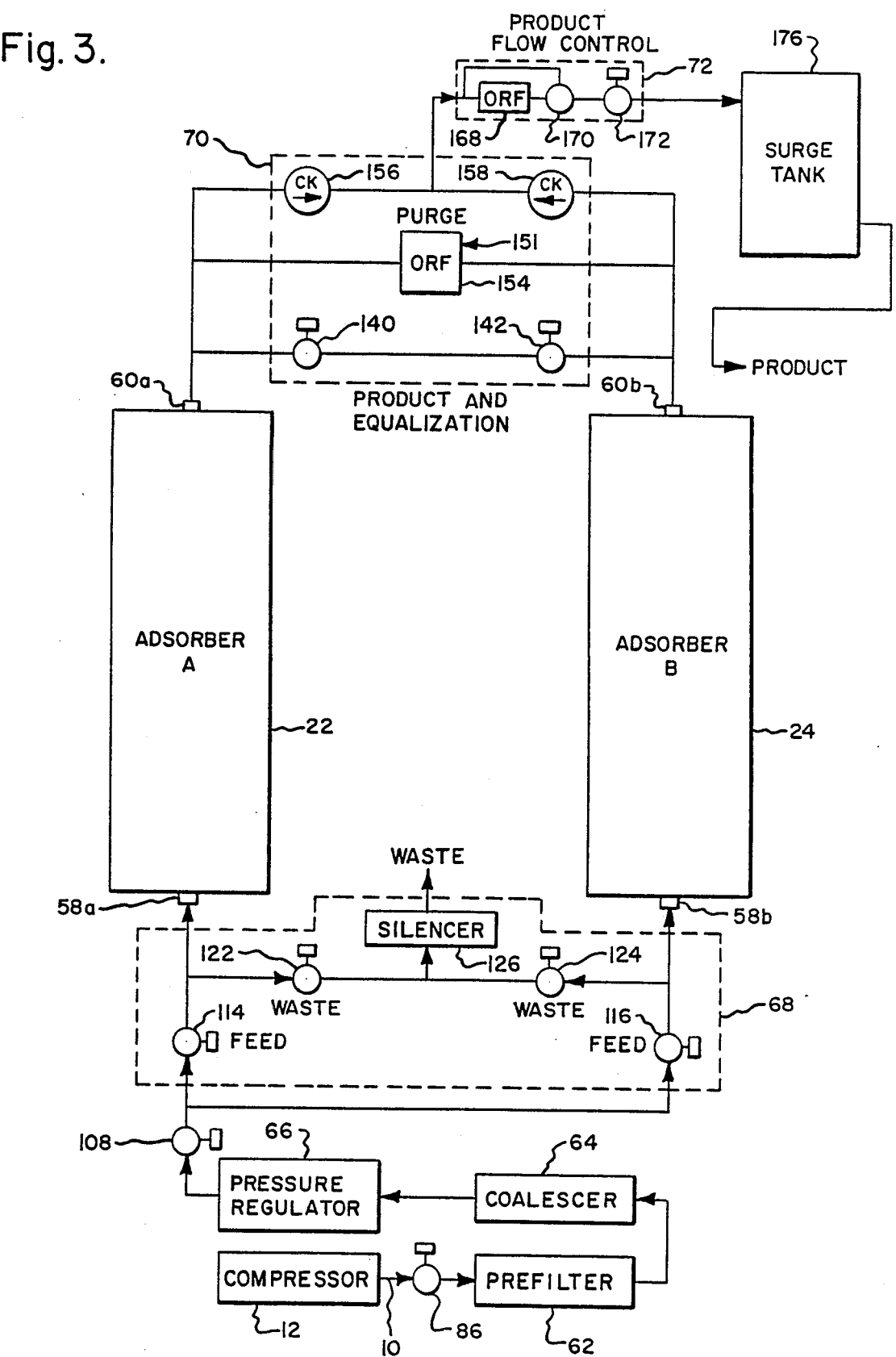
FIG. 3 is a block diagram illustrating the flow connections between working components of the Fig. separator.

With reference to FIGS. 2 and 3, each adsorber 22 or 24 includes an elongated, substantially elongated vessel 56a or 56b supported upright upon the base 32 and having an interior cavity which is substantially filled with a bed of adsorption material adapted to adsorb nitrogen from air routed therethrough. Furthermore, each adsorber 22 or 24 includes an inlet 58a or 58b and an outlet 60a or 60b adjacent the lower end of the corresponding adsorber vessel 56a or 56b wherein the inlet and outlet of each adsorber 22 or 24 are in flow communication with one another through the bed of adsorption material contained therein. Hence, air directed into each adsorber inlet 58a or 58b is exposed to the adsorption material before exiting the corresponding adsorber outlet 60a or 60b.

The adsorption beds of the adsorbers 22,24 may be comprised of any of a number of adsorbent materials such as activated carbon, silica gel or a molecular sieve material known as sodium alumina silicate. Characteristically, the adsorbent material adsorbs nitrogen from air routed through the corresponding adsorber 22 or 24 from the inlet to the outlet 60 thereof so that the gaseous product exiting the adsorber outlet is a high purity oxygen gas. Furthermore, the adsorbent material is adapted to release its adsorbed nitrogen when purged by a purge gas for purposes of regenerating the adsorbent material. As will be explained hereafter, only one of the adsorbers 22 or 24 performs adsorption at any one time while the other adsorber 24 or 22 undergoes regeneration. For increasing the efficiency of regeneration, an amount of the high purity oxygen produced by the adsorber 22 or 24 performing adsorption is used to purge the adsorber 24 or 22 undergoing regeneration.

With reference to FIG. 2, the working components 30 of the separator 20 include a prefilter 62, a coalescer 64, a pressure regulator 66, a waste and feed manifold assembly 68, a product manifold assembly 70 and a product flow control assembly 72. The prefilter 62 and coalescer 64 are mounted in side-by-side relationship against the back 36 of the control box 26 and adjacent the top 40 thereof. The pressure regulator 66 is operatively mounted against the back 36 of the control box 26 adjacent the top 40 thereof and to one side, or to the right as shown in FIG. 2, of the coalescer 64. Each of the prefilter 62, coalescer 64 and regulator 66 is supportedly fastened to the front surface 42 of the control box back 36 by means of screws and appropriate brackets 62a, 64a and 66a.

The waste and feed manifold assembly 68 is comprised of a generally linear arrangement of items, hereinafter described, disposed immediately below the prefilter 62, coalescer 64 and pressure regulator 66 and oriented in a manner so as to extend generally horizontally across the control box back 36. Similarly, the product manifold assembly 70 includes items, hereinafter described, arranged in a generally linear arrangement and disposed immediately below the waste and feed manifold assembly 68 so as to extend generally horizontally across the control box back 36. For attachment of the waste and feed manifold assembly 68 and product manifold assembly 70 to the control box back 36, a pair of angle members 74,76 having a pair of angularly related legs are affixed to the back 36 of the control box 26 so that one of its angularly related legs extends generally forwardly of the control box back 36. The waste and feed manifold assembly 68 and product manifold assembly 70 are each, in turn, supportedly attached atop the forwardly-extending leg of the corresponding angle member 74 or 76.

With reference still to FIG. 2, the product flow control assembly 72 includes items, hereinafter described, disposed generally below the product manifold assembly 70. A support pedestal 78 is supported upright upon the base 32, and the product flow control assembly 72 is supported atop the pedestal 78 so as to be positioned adjacent and in front of the control box back 36. The pedestal 78 and the product flow control assembly 72 are attached to the base 32 and pedestal 28, respectively, by means of bolts.

With reference still to FIG. 2, the input conduit 10 is connected to the inlet, indicated 82, of the prefilter 62 by means of piping 84 and a shutoff valve 86. The input conduit 10 enters the control box 26 through a hole in the back 36 (FIG. 1) and is operatively connected to the inlet side of the shutoff valve 86. The piping 84 is, in turn, connected between the outlet side of the valve 86 and the prefilter inlet 82. As air is routed through the prefilter 62, impurities such as liquids and coarse particles which may be carried by the flow of source air are removed and discharged through a prefilter outlet 90. The air stream filtered by the prefilter 62 exits through an additional prefilter outlet 92.

The coalescer 64 includes an inlet 94 operatively connected to the prefilter outlet 92 by means of piping 96 for receiving the air filtered by the prefilter 62. As air is routed through the coalescer 64, the fine impurities carried by the stream of source air and which escape collection by the prefilter 62 are coalesced and discharged through a coalescer outlet 98. The air stream filtered by the coalescer 64 exits through an additional coalescer outlet 100. Each of the coalescer outlet 98 and prefilter outlet 90 are operatively connected to a discharge tube 101 for routing the filtered and coalesced particles from the control box 26.

The pressure regulator 66 includes an inlet 102 which is operatively connected to the coalescer outlet 100 by means of piping 104 and includes an outlet 106 which is connected to a shutoff valve 108 by means of piping 110. In operation, the pressure regulator 66 reduces the pressure of the source air supplied by the compressor 12 to a predetermined pressure. If, for example, the separator 20 is designed to operate within an air pressure range of about sixty to seventy psig and air is delivered from the compressor 12 at about eighty psig, the regulator 66 operates to reduce the pressure of air passing through the regulator 66 by about ten to twenty psig.

With reference to FIG. 2, the waste and feed manifold 68 includes valving means 112 in the form of a pair of feed valves 114,116 connected between the shutoff valve 108 and the adsorber inlets 58a, 58b for routing air delivered from the pressure regulator 66 to the adsorber inlets 58a,58b. In this connection, two sections of piping 118 and 120 appropriately extend from the outlet of the shutoff valve 108, and the valving means 112 includes a pair of feed valves 114,116 connected in-line between a corresponding one of the piping 118 and 120 and the adsorber inlet 58a and 58b. Connected between each feed valve 114 or 116 and a corresponding adsorber inlet 58a or 58b is a T-connection 132 or 134 and a section of piping 136 or 138.

The waste and feed manifold 68 further includes a pair of waste valves 122 and 124 and a silencer 126. The waste valves 122 and 124 include inlets 128,130, respectively, operatively joined in flow communication with the outlet of a corresponding feed valve 114 or 116 by means of a corresponding T-connection 132 or 134. The silencer 126 is operatively connected to the outlets of the waste valves 122 and 124 for receiving gaseous product exiting the waste valves 122 and 124. In operation, gaseous product entering either waste valve 122 or 124 is discharged to the atmosphere through the silencer 126. Sounds normally associated with the discharging of a pressurized stream of gas to the atmosphere are muffled by the silencer 126.

As best shown in FIG. 2, the waste valves 122 and 124 and silencer 126 are arranged in a generally linear side-by-side arrangement 30 so that the silencer 126 is positioned between the waste valves 122 and 124. Furthermore, the waste valves 122,124 and silencer 126 are oriented within the control box 26 so that the linear arrangement provided thereby is oriented substantially horizontally. The feed valves 114,116 are oriented generally outboard of the waste valves 122,124 so that each feed valve 114 or 116 is arranged to one side of a corresponding waste valve 122 or 124.

The product manifold assembly 70 is associated with the outlets 60a, 60b of the adsorbers 22 and 24 and includes a pair of product and equalization valves 140 and 142 for equalizing the internal pressure of the adsorbers 22 and 24 between product-producing and regeneration cycles. The product equalization valves 140 and 142 are operatively connected to the adsorber outlets 60a and 60b by means of piping 144 and 146 and T-connections 148 and 150. By opening the valves 140 and 142, the adsorber containers 56a,56b communicate with one another through the adsorber outlets 60a,60b in a manner permitting the internal pressure of the adsorbers 22 and 24 to equalize. By closing the valves 140 and 142, flow of gaseous product between the adsorber outlets 60a and 60b through the valves 140 and 142 is prevented.

As best shown in FIGS. 2, the equalization valves 140 and 142 are arranged in a substantially linear, side-by-side arrangement and are arranged within the control box so that the linear arrangement provided thereby is oriented substantially horizontally. Furthermore, the equalization valves 140 and 142 are disposed generally beneath the waste valves 122,124.

With reference still to FIG. 2, there is illustrated a purge loop 151 including a section of purging piping 152 connected in parallel flow relation to the product equalization valves 140 and 142. Mounted within the purge piping 152 is a purge orifice 154 (FIG. 3). During a regeneration operation of one of the adsorbers 22,24, the purge orifice 154 limits the amount of gaseous product permitted to move between the outlets 60a,60b of the adsorbers 22,24. Furthermore, and with reference to FIGS. 2 and 3, a pair of check valves 156,158 are connected in parallel flow relation to the product equalization valves 140,142 by way of piping sections 160,162 and a T-connection 164. In operation, the check valves 156,158 restrict the movement of gaseous product through the piping 160 and 162 to one direction so that all of the gaseous product moving through the check valves 156,158 is directed out of the T-connection 164 through a piping conduit 166.

The product flow control assembly 72 is connected to the T-connection 164 through the piping conduit 166 for receiving gaseous product flowing therethrough. The product flow control assembly 72 defines an orifice 168 (FIG. 3) and includes pressure sensing means 170 for sensing pressure of the air or gaseous product at preselected locations in the separator piping. Also associated with the product flow control assembly 72 is a solenoid valve 172 through which product gases which exit the product flow control assembly 72 are routed. Attached to the discharge or downstream side of the solenoid valve 172 is a section of piping 174 which extends through the control box through a hole in the back 36 (FIG. 1) through which product gas exits the separator 20. During operation of the separator 20 the product flow control assembly 72 and solenoid valve 172 effectively provide constant oxygen purity at a regulated pressure. In the illustrated view of FIG. 2, the gaseous product produced by the separator 20 is delivered to a surge tank 176 for use.

Operation of the air separator 20 can be described briefly through a description of the sequencing of the valving means of the separator 20. Before the air separator 20 is initially turned ON, the equalization valves 140,142 are opened to permit the internal pressures of the adsorbers 22,24 to equalize. Meanwhile, the feed valves 114,116 and waste valves 122,124 are closed. At start-up of the separator 20, the equalization valves 140 and 142 are closed, and feed valve 114 and waste valve 124 are opened. The source air entering the separator 20 through the conduit 10 is thereby directed through the adsorber 22 from its inlet 58a to its outlet 60a so that high-purity oxygen is produced thereby, and an amount of oxygen emitted from the adsorber outlet 60a is directed through the purge orifice 154 (FIG. 3), through the adsorber 24 from the outlet 60b to the inlet 58b thereof, and through the waste valve 124.

When the adsorber 22 becomes about saturated, each of the feed valve 114 and waste valve 124 is closed and the equalization valves 140,142 are opened to thereby permit the internal pressures of the adsorbers 22,24 to equalize. Once the adsorber pressures are equalized, the equalization valves 140,142 are closed and the feed valve 116 and waste valve 122 are opened. The source air entering the separator 20 through the conduit 10 is thereby directed through the adsorber 24 from its inlet 58b to its outlet 60b so that high-purity oxygen is produced thereby, and an amount of oxygen emitted from the adsorber outlet 60b is directed through the purge orifice 154 (FIG. 3), through the adsorber 24 from the outlet 60a to the inlet 58a thereof, and through the waste valve 122.

When the adsorber 24 becomes about saturated, each of the feed valve 116 and waste valve 122 is closed and the equalization valves 140,142 are opened to thereby permit the internal pressures of the adsorbers 22,24 to equalize. At that point, the cycles of operation are repeated with the closing of equalization valves 140,142 and reopening of the feed valve 112 and the waste valve 124. It follows that while one adsorber produces oxygen-righ product gas in a product-producing cycle, the other adsorber is being purged of the adsorber air constituent in a regeneration operation, and vice-versa.

Each of the aforementioned feed, waste and equalization valves is preferably a solenoid-type valve responsive to a turning on or shutting off of power to the valve, and control of the various product-producing and regeneration operations can be had by appropriately sequencing the opening and closing of the aforedescribed feed, waste and equalization valves. In the separator 20, control of the aforedescribed valves is achieved by timing mechanisms associated with control switches 178 (FIG. 2) mounted within the control box 26 in the top 40 thereof and operatively wired to the valves for turning the valves ON and OFF at the end of a predetermined period of time. Hence, product-producing and regeneration operations are automatically controlled in the separator 20 by automatically controlling the amount of time that each of the feed, waste and equalization valves are opened and closed.

It will be understood that the aforedescribed invention accomplishes its intended objects in that the working components 30, in the form of feed valves 114,116, waste valves 122,124 and equalization valves 140,142, are mounted in such a relationship with one another within the control box 26 that access to each component 30 is facilitated. The prefilter 62, coalescer 64 and pressure regulator 66 are superposed above the waste and feed manifold assembly 68 which is, in turn, superposed above the product flow control assembly 72. Hence, each of the aforedescribed components are arranged in substantially vertical, planar relationship with one another and adjacent the control box back 36. Therefore, upon removing the control box cover 46, a repairman requiring access to any of the aforedescribed control box components will view the arrangement of components 30 substantially as shown in FIG. 2 so that access to any desired component therein can be had with relative ease. The flow of gas to the components 30 can be shut off for servicing purposes by means of shutoff valves 86 or 108.

It will be understood that numerous modifications and substitutions will be had to the aforedescribed embodiment without departing from the spirit of the invention. For example, although the product manifold assembly 70 of the aforedescribed separator 20 has been shown and described as including a pair of equalization valves 140,142, a separator in accordance with the present invention may include one such valve wherein the one valve possesses the capacity to effectively control flow in either of two directions therethrough. Accordingly, the aforedescribed embodiment is intended for purposes of illustration and not as limitation.

We claim:

1. In a pressure swing adsorption apparatus including a pair of adsorbers each having an inlet and an outlet and adapted to fractionate at least one constituent from a gaseous mixture delivered from a feed stream by sequentially directing the gaseous mixture from the feed stream into the inlet of one adsorber so that said one adsorber performs adsorption while simultaneously purging the other adsorber of adsorbed constituent with product gas withdrawn from the outlet of the one adsorber and then directing the gaseous mixture from the feed stream into the inlet of the other adsorber so that said other adsorber performs adsorption while simultaneously purging the one adsorber of adsorbed constituent of product gas withdrawn from the outlet of the other adsorber wherein the apparatus includes feed and waste valving means associated with the inlets of the adsorbers to which the gaseous mixture is selectively routed to the inlet of one or the other adsorber for the production of product gas and through which product-depleted waste gas is discharged from the adsorber being purged and a purge loop and equalization valving means associated with the outlets of the adsorbers permitting the adsorbers to communicate with one another through the outlets thereof for the purposes of purging one and then the other of the adsorbers and for equalizing the internal pressure of the adsorbers between preselected stages of adsorber operation, the improvement comprising:

a base;

an elongated control box for housing the feed and waste valving means of the apparatus, said control box being directly mounted upon said base so that its longitudinal axis is oriented generally vertically and including a substantially planar back oriented generally vertically, the valving means of the apparatus are supportedly attached to said planar back in a substantially coplanar and vertical arrangement facilitating service and maintenance of said valving means, and said pair of adsorbers include a pair of towers directly mounted upon said base and oriented in a generally vertical, side-by-side arrangement and positioned in such a relationship with the control box so that the back panel of the control box is positioned adjacent and so as to span the width of the adsorber towers, the towers and the control box being attached to one another so that the vertical stability of each of the towers and control box contributes to the vertical stability of each of the other of the towers and control box.

2. The improvement of claim 1 wherein at least one of said valving means is superposed above another of said valving means.

3. The improvement of claim 1 further comprising automatic control means for automatically controlling the operation of said feed valving means, equalization valving means and waste valving means, said automatic control means including controls which are superposed generally above each of the feed valving means, equalization valving means and waste valving means to facilitate servicing and maintenancing of said controls.

4. A pressure swing adsorption apparatus for fractionating at least one constituent from a gaseous mixture, said apparatus comprising:
a base;
a pair of adsorbers each having an inlet and an outlet and adapted to adsorb a preselected constituent from a gaseous mixture delivered from a feed stream and routed from the inlet to the outlet thereof and adapted to desorb the adsorbed constituent and thus undergo regeneration when purged by gaseous product exiting the outlet of the other adsorber and routed from the outlet to the inlet thereof, said pair of adsorbers including a pair of towers directly mounted upon said base and oriented generally vertically and in a side-by-side arrangement;
feed valving means operatively connected between the inlets of the adsorber and the feed stream for directing gaseous mixture from the feed stream into the inlet of one and the other adsorber in an alternating fashion so that only one adsorber at a time performs adsorption and produces product gas;
a purge loop connected between the outlets of the adsorbers for permitting product gas exiting the outlet of the adsorber performing adsorption to enter the outlet of the other adsorber for purging the other adsorber of adsorbed constituent and so that while one adsorber performs adsorption, the other adsorber undergoes regeneration;
equalization valving means connected between the outlets of the adsorbers for equalizing the internal pressures of the adsorbers between preselected stages of apparatus operation;
waste valving means associated with the outlets of the of the adsorbers through which productdepleted waste gas discharged from the inlet of the adsorber undergoing regeneration is rejected; and
an elongated control box for housing the feed valving means, the equalization valving means and the waste valving means of the apparatus, said control box being directly mounted upon said base so that its longitudinal axis is oriented substantially vertically and including a substantially planar back oriented generally vertically, said pair of adsorber towers being positioned upon said base adjacent the control box so that the back thereof is positioned in relatively close proximity to and spans the width of both towers, the feed valving means, the equalization valving means and the waste valving means being supportedly attached in a single vertical plane to the planar back of the control box so as to facilitate service and maintenance of the apparatus, said control box and the adsorber towers being attached to one another so that the vertical stability of each of the towers and control box contributes to the vertical stability of each of the other of the towers and the control box.

5. The apparatus as defined in claim 4 wherein at least one of the feed, equalization and waste valving means is superposed above another of the feed, equalization and waste valving means.

6. The apparatus as defined in claim 4 wherein the feed valving means includes a pair of feed valves and the waste valving means includes a pair of waste valves, said waste valves being arranged generally in a side-by-side relationship and said feed valves are positioned generally outboard of the side-by-side arrangement of waste valves.

7. The apparatus as defined in claim 4 wherein the waste valving means includes a pair of feed valves arranged in a generally side-by-side relationship and said equalization valving means is disposed generally beneath the side-by-side arrangement of waste valves.

8. The apparatus as defined in claim 4 further comprising automatic control means for automatically controlling the operation of said feed valving means, equalization valving means and waste valving means, said automatic control means including controls which are superposed generally above each of the feed valving means, equalization valving means and waste valving means to facilitate servicing and maintenancing of said controls.

9. An air separator for separating at least one constituent element from air delivered from an air source, said separator comprising:
a base;
a pair of adsorbers each including a pair of towers and a bed of adsorbent material adapted to adsorb a preselected constituent from air delivered from a source and adapted to desorb the adsorbed constituent and thus undergo regeneration when purged by product gas produced by the other adsorber, each adsorber having an inlet and outlet accommodating a flow of air or product gas therebetween, said adsorber towers being directly mounted upon said base and oriented generally vertically and in a side-by-side relationship;
an elongated control box being directly mounted upon said base so that the longitudinal axis of the control box is oriented generally vertically, and including a planar back oriented substantially vertically;
feed valving means operatively associated with the inlets of the adsorber and the air source for directing air from the source into the inlet of one and the other adsorber in an alternating fashion so that only one adsorber at a time performs adsorption and produces product gas;
a purge loop connected between the outlet of the adsorber permitting product gas exiting the outlet of the adsorber performing adsorption to enter the outlet of the other adsorber for purging the other adsorber of adsorbed constituent and so that while one adsorber performs adsorption, the other adsorber undergoes regeneration;
equalization valving means associated between the outlets of the adsorbers for equalizing the internal pressures of the adsorbers between preselected stages of apparatus operations; and
waste valving means associated with the outlets of the adsorbers through which product-depleted waste gas discharged from the inlet of the adsorbers undergoing regeneration is rejected, said feed valving means, equalization valving means and waste valving means being supportedly attached to the planar back of said control box so as to be disposed in generally a planar and vertical arrangement thereagainst so that servicing and maintenance of said feed valving means, equalization valving means and waste valving means is facilitated, said control box being disposed relative to said towers so that the planar back is proximate to and generally spans the width of both adsorber towers, said control box and towers being attached to one another so that the vertical stability of each of the towers and control box upon the base contributes to the vertical stability of each of the other of the towers and control box.

10. The air separator of claim 9 wherein at least one of the feed, equalization and waste valving means is superposed above another of the feed, equalization and waste valving means.

11. The air separator of claim 9 wherein the feed valving means includes a pair of feed valves and the waste valving means includes a pair of waste valves, said waste valves being arranged generally in a side-by-side relationship and said feed valves are positioned generally outboard of the side-by-side arrangement of waste valves.

12. The air separator of claim 9 wherein the waste valving means includes a pair of feed valves arranged in a generally side-by-side relationship and said equalization valving means is disposed generally beneath the side-by-side arrangement of waste valves.

13. The air separator of claim 9 further including filtering componentry operatively connected upstream of the feed valving means for filtering source air and said filtering componentry is supportedly mounted within the control box in the plane of the generally planar arrangement of said feed, equalization and waste valving means.

14. The air separator of claim 9 further including a pressure regulator operatively connected upstream of the feed valving means for regulating the pressure of source air delivered to the feed valving means, said pressure regulator being supportedly mounted within the control box in the plane of the generally planar arrangement of said feed, equalization and waste valving means.

15. The air separator of claim 9 further including a product flow controller operatively connected downstream of the adsorber outlets for controlling the flow of product gas from said separator, said product flow controller being mounted within the control box in the plane of the generally planar arrangement of said feed, equalization and waste valving means.

16. The air separator of claim 9 further including automatic control means for automatically controlling the operation of said feed valving means, equalization valving means and waste valving means, said automatic control means including controls which are superposed generally above each of the feed valving means, equalization valving means and waste valving means to facilitate servicing and maintenancing of said controls.

* * * * *